Patented Nov. 7, 1933

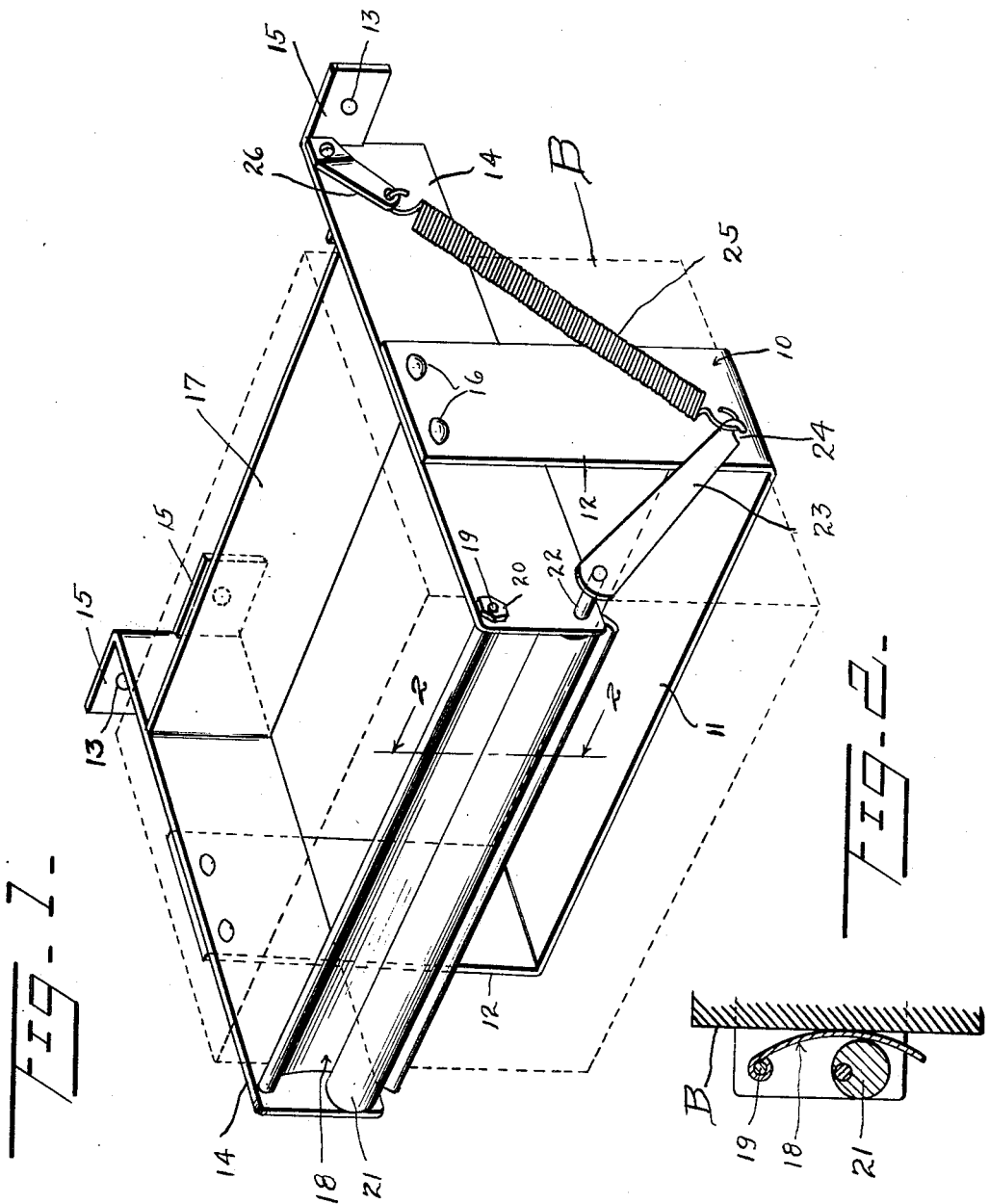

1,934,588

UNITED STATES PATENT OFFICE 1,934,588

BATTERY HANGER

Andy O. Butler, Hot Springs, N. Mex.

Application August 13, 1932. Serial No. 628,755

4 Claims. (Cl. 180—68.5)

This invention relates to battery supports and more particularly to a support or hanger which can be mounted in any of the vehicle frames at present in use so as to removably support a battery.

An object of this invention is to provide a hanger or support so that the battery will be held against movement but at the same time the battery be so held that it can be quickly and easily released for removal from the support or hanger.

Another object of this invention is to provide a hanger of this kind which is so constructed that the pressure member will be automatically held into contact with the battery so as to eliminate the possibility of loosening of the pressure on the battery.

The above and various other objects and advantages of this invention will in part be described in and in part be understood from the following detailed description of the present preferred embodiment, the same being illustrated in the accompanying drawing, wherein:—

Figure 1 is a detailed perspective view of a hanger constructed according to the preferred embodiment of this invention and showing in dotted lines a conventional battery therein;

Figure 2 is an enlarged fragmentary sectional view taken on the line 2—2 of Figure 1.

Referring to the drawing, wherein like numerals of reference designate corresponding parts throughout the several views, the letter B designates generally a battery of conventional construction, such as is used for motor vehicles or the like.

The usual type of hanger or clamp for the battery B in vehicles, at present in use, contemplates the engagement of the top of the battery at each end by clamping means which hold the battery down within the support. These hold down clamps, however, gradually work loose under a vibration and in addition thereto do not hold the battery B against lateral movement within the boxing or support.

In order to provide means whereby this battery will be securely clamped within a hanger carried by the vehicle, I have provided a substantially U-shaped hanger, generally designated as 10, which includes a bottom supporting bar 11 and end bars or legs 12. The end bars or vertical legs 12 are secured to horizontal arms 14, having outturned or angular end portions 15 provided with holes or apertures 13 by means of which securing bolts or rivets may be engaged with the outturned lugs 15 to secure the hanger 10 within the frame or vehicle. The vertical legs 12 are secured to the horizontal arms 14 as by rivets 16, or the like, or if desired these legs 12 may be welded or otherwise secured to the arms 14.

A cross bar 17 connects the arms 14 together and is adapted to engage against one side of the battery B, when disposed within the hanger 10. The cross bar or connecting member 17 is disposed at a point forwardly from the inner ends of the arms 14 so that the battery B will be held in outwardly spaced relation to the frame of the vehicle or to the member to which the hanger 10 is attached.

In order to provide means whereby the battery B will be releasably and removably secured within the hanger 10, I have provided a front wall or connecting member, generally designated as 18, which is disposed between the arms 14, adjacent the forward ends thereof. This member 18 constitutes a battery binding or securing member and is curved transversely and is swingably mounted on a rod or pivotal member 19, which is secured, as by nuts 20, to the arms 14 so that the battery binding member 18 will have swinging movement toward or away from the battery B. This battery engaging member 18 is held into engagement with the side wall of the battery B by means of an eccentric 21 which has trunnions 22, extending through the arms 14.

A lever or pressure member 23 is secured to one of the trunnions 22 and the free end of the lever 23 has a notched portion or hook 24, which is engaged by one end of a spring 25. The other end of the spring 25 is secured to a strap 26, carried by the inner end of one of the arms 14. This spring 25 acts to automatically tighten or bind the battery B between the rear wall or bar 17 and the swinging wall 18.

By providing a hook 24 to receive an end portion of the spring 25, the lever 23 can be readily released to permit removal of the battery by unhooking the spring 25, thereby permitting the lever 23 to be swung in a direction to carry the eccentric pressure member 21 out of engagement with the swinging front wall 18.

In the use and operation of this device, a hanger, including the U-shaped member 18 and the arms 14 may be attached to the desired support, such as a vehicle frame or the like, by passing rivets or bolts through the apertures 13 in the oppositely directed lugs 15 carried by each arm 14. Initially, the spring 25 is released from the lever 23 thereby permitting the front wall 18 to be rocked on the pivotal rod 19. The battery B may then be placed within the hanger and when so mounted, the lower or forward end of the spring 25 may be engaged with the hook 24, thereby swinging the eccentric 21 against the wall 18 and yieldably binding the battery B within the hanger.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A battery hanger comprising a frame structure, said frame structure having a movable wall, means for swingably mounting the movable wall within the frame and means engaging the swingable wall to swing the wall inwardly to bind the battery within the frame.

2. A battery hanger comprising a frame structure, means carried by the frame to attach the frame to a supporting member, said frame including a fixed side wall, a movable side wall, eccentric wall engaging means engaging the movable wall and yieldable means engaging the eccentric means to press the movable wall against the side of the battery mounted in the frame.

3. A battery hanger comprising a frame adapted to receive a battery, means for securing the frame to a supporting member, said frame including a bottom member, end members and a pair of side members, one of said side members being movable, an eccentric pivotally supported by the end members, a lever carried by the eccentric and a spring engaging the lever and a fixed portion of the frame to constantly urge the eccentric against the movable side to force said side against the side wall of the battery.

4. A battery hanger comprising a frame, said frame including a bottom, end members, a fixed side member secured to the ends, a swingable side member, means for swingably mounting said latter side member between the end members, an eccentric engaging the swingable side, means for swingably mounting the eccentric between the end members, a lever secured to said eccentric mounting means and a spring secured at one end to the frame and engaging the free end of the lever to constantly urge the eccentric against the swinging wall to force said wall inwardly against the side wall of the battery.

ANDY O. BUTLER.